No. 665,823. Patented Jan. 8, 1901.
M. H. BECK & J. R. CAYNOR.
CAGE CHAIR FOR MINES.
(Application filed Oct. 18, 1900.)
(No Model.) 2 Sheets—Sheet 1.
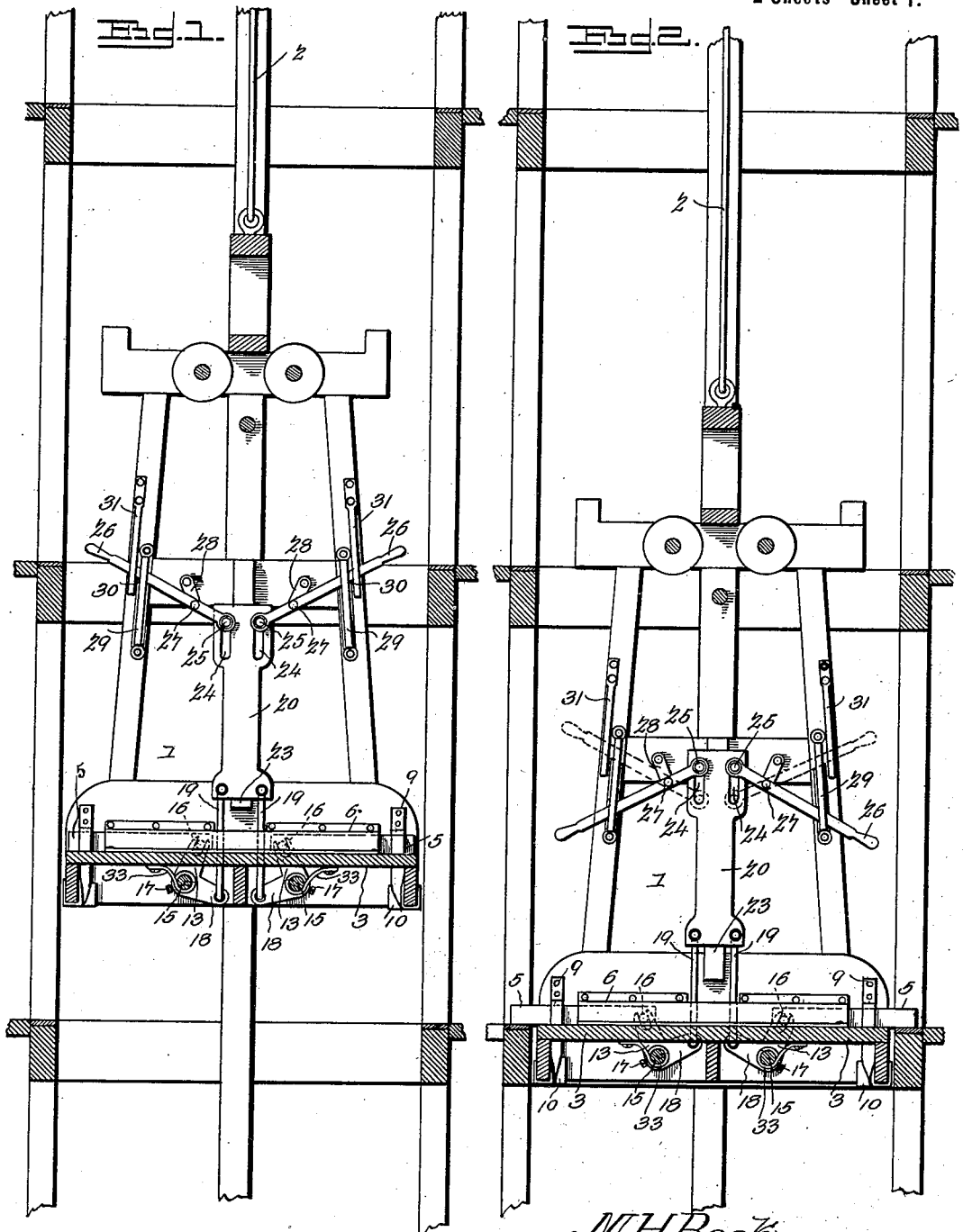

No. 665,823. Patented Jan. 8, 1901.
M. H. BECK & J. R. CAYNOR.
CAGE CHAIR FOR MINES.
(Application filed Oct. 18, 1900.)
(No Model.) 2 Sheets—Sheet 2.
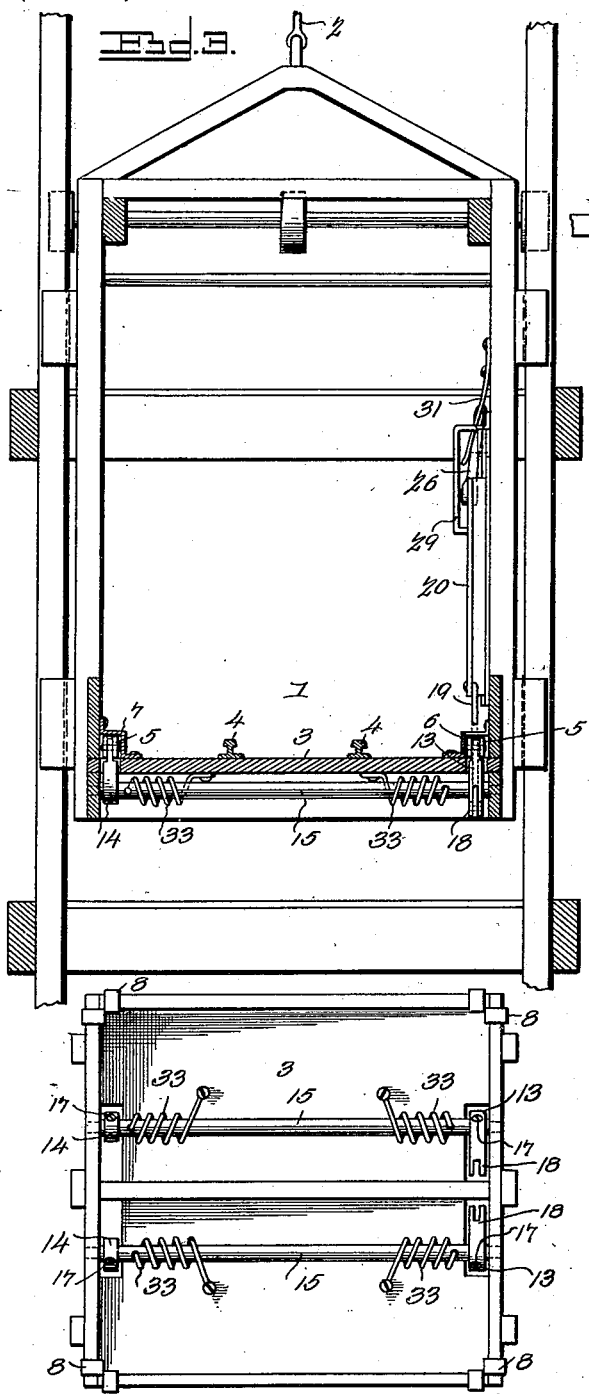

UNITED STATES PATENT OFFICE.

MELVIN H. BECK AND JULIUS R. CAYNOR, OF VICTOR, COLORADO.

CAGE-CHAIR FOR MINES.

SPECIFICATION forming part of Letters Patent No. 665,823, dated January 8, 1901.

Application filed October 18, 1900. Serial No. 33,500. (No model.)

*To all whom it may concern:*

Be it known that we, MELVIN H. BECK and JULIUS R. CAYNOR, citizens of the United States, residing at Victor, in the county of Teller and State of Colorado, have invented a new and useful Cage-Chair for Mines, of which the following is a specification.

The invention relates to improvements in cages for mines.

One object of the present invention is to improve the construction of cages for mines, more especially the means for supporting a cage at the different stations of the shaft of a mine, and to provide automatically-operating chairs adapted to be thrown outward by the station-tender or from the cage and adapted when the cage is raised and the pressure removed to return automatically to their retracted positions.

A further object of the invention is to provide a device of this character which will obviate the necessity of providing chairs at each of the stations of a shaft and which will prevent the injury resulting from a cage contacting with such chairs.

The invention consists in the construction and novel combination and arrangement of parts hereinafter fully described, illustrated in the accompanying drawings, and pointed out in the claims hereto appended.

In the drawings, Figure 1 is a vertical sectional view of a cage constructed in accordance with this invention and arranged within a shaft, the chairs being retracted. Fig. 2 is a vertical sectional view, the cage being at a station and the chairs being extended. Fig. 3 is a vertical sectional view taken at right angles to Fig. 1. Fig. 4 is a reverse plan view of the cage. Fig. 5 is a detail sectional view illustrating the manner of mounting the slide. Fig. 6 is a detail view illustrating the means for holding the chair-operating levers in an elevated position. Fig. 7 is a detail view illustrating the manner of mounting the chairs. Fig. 8 is a detail view illustrating the manner of connecting the chairs with the arms of the rock-shafts.

Like numerals of reference designate corresponding parts in all the figures of the drawings.

1 designates a cage designed to be arranged in the shaft of a mine in the usual manner and to be connected to the cable 2 of the hoisting apparatus, and it is provided with a suitable platform 3, having the usual track-rails 4 at its upper face. The cage is provided at opposite sides with horizontally-reciprocating chairs 5, arranged in pairs at each side of the cage and adapted to be extended beyond the same, as illustrated in Fig. 2 of the accompanying drawings, for supporting the cage at a landing, and by mounting the said chairs on the cage it will obviate the necessity of providing chairs at the several landings of a shaft and will prevent the injuries resulting from cages coming in contact with such chairs.

The cage is provided at opposite sides with casings 6 and 7, forming housings for reciprocating chairs, and the bottom of the cage is braced by metal straps 9 and 10, secured at their upper ends to the cage above the platform thereof and provided at their lower ends with L-shaped arms, which are arranged at the lower edges of the bars or beams at the base of the cage, as clearly illustrated in Fig. 7 of the accompanying drawings. The strap 9 is provided near its upper end with an angular bend to clear the adjacent bolt, and it assists in supporting the same. The strap 10 extends vertically on the outside of the cage from the lower edge of the bar or beam, which is engaged by its L-shaped arm, and the inner strap 9 extends through the floor or platform 4 of the cage.

The reciprocating chairs have their inner ends 12 bifurcated to receive the ends of upwardly-extending arms 13 and 14 of a pair of rock-shafts 15, and the said arms 13 and 14 are forked or bifurcated to engage pins 16, which extend across the bifurcations of the inner ends of the chairs. The arms are provided at their lower ends with eyes or openings to receive the parallel rock-shafts and are secured to the same by set-screws 17 or other suitable fastening devices, and the arms 13 are provided with integral inwardly-extending arms 18, which are connected by a pair of upwardly-extending rods 19 with a vertical slide 20, located at one side of the cage, as clearly shown in Figs. 1 and 2 of the accompanying drawings. The inwardly-extending arms 18 are located beneath the platform of the cage, which is provided with a slot or opening to receive the rods 19 and to permit the inwardly-extending arms 18 to swing upward from the position illustrated in Fig. 1 of the accompanying drawings to that shown in Fig. 2 when the parallel shafts are rocked. The slide 20, which is located above the platform, is provided at its back or inner face with approximately L-shaped flanges 21, receiving laterally-extending flanges 22 of a guide 23 of the cage, and the upper portion of the slide is enlarged and is provided with a pair of vertical slots 24. The slots 24 receive pins 25 of a pair of operating-levers 26, which are fulcrumed between their ends by pivots 27, which pass through the lower ends of a pair of links 28, and the latter are pivoted at their upper ends to the frame of the cage and are adapted to oscillate to permit a limited longitudinal movement of the operating-levers, either of which is adapted to be swung downward from the position illustrated in Fig. 1 to that shown in Fig. 2 to extend the chairs for arranging the latter for supporting the cage. The slots permit either of the levers to be operated without moving the other, and they also enable a lever after it has been operated to be returned to the position illustrated in Fig. 1 of the accompanying drawings, so that the chairs will operate automatically, as hereinafter explained. The outer portions of the operating-levers are arranged in loops or guides 29 and are adapted to engage catches 30, located at the upper portions of the guide-loops 29, adjacent to springs 31, which are adapted to retain the levers in engagement with the catches 30, as clearly illustrated in Fig. 6 of the accompanying drawings. The lever is readily disengaged from the catch by swinging it laterally toward the spring, and the latter has its free end 32 extended beyond the catch to enable it to be readily engaged by the lever in raising the latter.

Either of the levers is adapted to be operated, and the operation may be effected by a person at the station or on the cage, and when one of the levers is swung downward to the position illustrated in full lines in Fig. 2 of the accompanying drawings the rock-shafts will be rotated by the upward movement of the slide and the chairs will be projected beyond the cage and caused to rest upon the floor or supporting-surface at the station, the weight of the cage and its contents holding the chairs in such extended position after the levers or lever has been returned to its raised position, the slots permitting the levers to be swung upward independently of the slide. The parallel rock-shafts have spiral springs 33 disposed on them and connected with them and with the bottom of the cage, as clearly illustrated in Fig. 4 of the accompanying drawings. The rock-shafts are rotated against the action of the springs when the chairs are projected, and the said springs are adapted to automatically retract the chairs as soon as the latter are relieved of pressure by the upward movement of the cage. This construction will effectually prevent the chairs from being accidentally left in an extended position, which would result in injury to the cage, as the said chairs would contact with the shaft at the top of the station or with the framing or lining, as will be readily apparent. The lever, which is swung downward to operate the projecting chairs, may be returned to an elevated position by the operator, or it may be allowed to remain at the bottom of the guide-loop 29, and the coiled springs of the rock-shafts will swing the lever upward when the chairs are retracted. The casing 6, adjacent to the slide, is provided at its top with a recess, forming an opening for the passage of the rods or links 19, which are pivoted at their upper ends to the slide and at their lower ends to the inwardly-extending arms of the rock-shafts.

It will be seen that the chairs and the means for operating the same are exceedingly simple and inexpensive in construction, that they are adapted to be readily applied to a cage, and that they will obviate the necessity of providing a series of chairs for a shaft. It will also be apparent that as the chairs are capable of returning automatically to their retracted position they will be effectually prevented from being accidentally left in an extended position and cannot contact with the walls of a shaft when the cage is raised by the hoisting mechanism. Furthermore, it will be apparent that the free end of the spring 31 projects beyond the catch to form a guide for directing the lever into engagement with the said catch when the said lever is swung upward by the springs of the rock-shafts.

Another advantage of the invention is that the chairs and the operating mechanism are adapted to be readily applied to any ordinary mine cage or car without necessitating any material alteration in the construction of the cage or car.

What we claim is—

1. The combination with a cage, of reciprocating chairs mounted on the cage, of rock-shafts provided with arms connected with the chairs, springs for actuating the rock-shafts to return the chairs automatically to their retracted position, and operating mechanism connected with and adapted to actuate the rock-shafts to project the chairs, said operating mechanism being capable of movement independently of the rock-shafts, whereby it is adapted to be arranged to permit the chairs to operate automatically, substantially as described.

2. The combination with a cage, of reciprocating chairs mounted on the cage and arranged in pairs, parallel rock-shafts journaled in suitable bearings of the cage and provided at their ends with arms connected with the chairs, coiled springs disposed on the rock-shafts and connected with the same and with the cage, and operating mechanism for rotating the rock-shafts to project the chairs, substantially as described.

3. The combination with a cage, of chairs mounted thereon, rock-shafts having arms connected with the chairs, a slide mounted on the cage and connected with the rock-shafts, an operating-lever fulcrumed on the cage and connected with the slide and having a limited movement independent of the same, and means for automatically actuating the rock-shafts to return the chairs, substantially as described.

4. The combination with a cage, of chairs mounted thereon, rock-shafts provided with inwardly and upwardly extending arms, the upwardly-extending arms being connected with the chairs, a vertically-movable slide mounted on the cage, links pivotally connected with the slide and with the inwardly-extending arms of the rock-shafts, and means for actuating the slide, substantially as described.

5. The combination with a cage, of chairs mounted thereon, rock-shafts provided with upwardly-extending arms connected with the chairs, a vertically-movable slide, links connecting the slide with the rock-shafts, a pair of operating-levers connected with the slide and having a limited movement independently thereof, and means for automatically returning the chairs to their retracted position when the pressure is removed.

6. The combination with a cage, of chairs mounted thereon, rock-shafts having arms connected with the chairs, a vertically-movable slide mounted on the cage and provided with vertical slots, means for connecting the slide with the rock-shafts, levers fulcrumed between their ends and provided with pins operating in the slots of the slide, and a spring for returning the chairs, substantially as described.

7. The combination with a cage, of chairs mounted thereon, rock-shafts located beneath the platform of the cage and provided with arms connected with the chairs, a guide mounted on the cage, a slide arranged on the guide and provided at its top with slots, links connecting the lower end of the slide with the rock-shafts, coiled springs disposed on the rock-shafts and connected with the same and with the cage, and the operating-levers having pins arranged in the slots of the slide, substantially as described.

8. The combination with a cage, of chairs mounted thereon, a slide, a lever connected with the slide and having a limited movement independently thereof, means for connecting the slide with the chairs, a guide-loop receiving the outer portion of the lever, a catch arranged to be engaged by the latter, and a spring located adjacent to the catch and adapted to retain the lever in engagement with the same, and projecting from the catch to form a guide for directing the lever into such engagement, substantially as described.

In testimony that we claim the foregoing as our own we have hereto affixed our signatures in the presence of witnesses.

MELVIN H. BECK.
JULIUS R. CAYNOR.

Witnesses:
 I. S. GARTLEY,
 JOHN WILLIAMS,
 SHERMAN BERLIN.